United States Patent
Fuse et al.

(10) Patent No.: US 10,502,117 B2
(45) Date of Patent: Dec. 10, 2019

(54) HEAT STORAGE SYSTEM

(71) Applicant: DENSO CORPORATION, Kariya, Aichi-pref. (JP)

(72) Inventors: Takuya Fuse, Kariya (JP); Shinya Kasamatsu, Kariya (JP); Yasushi Kono, Kariya (JP)

(73) Assignee: DENSO CORPORATION, Kariya (JP)

( * ) Notice: Subject to any disclaimer, the term of this patent is extended or adjusted under 35 U.S.C. 154(b) by 188 days.

(21) Appl. No.: 15/329,617

(22) PCT Filed: Jul. 9, 2015

(86) PCT No.: PCT/JP2015/003480
§ 371 (c)(1),
(2) Date: Jan. 27, 2017

(87) PCT Pub. No.: WO2016/017084
PCT Pub. Date: Feb. 4, 2016

(65) Prior Publication Data
US 2017/0218825 A1    Aug. 3, 2017

(30) Foreign Application Priority Data
Jul. 29, 2014   (JP) .................. 2014-153726

(51) Int. Cl.
*F01N 5/02*    (2006.01)
*F01P 3/20*    (2006.01)
(Continued)

(52) U.S. Cl.
CPC ............ *F01N 5/02* (2013.01); *F01N 3/206* (2013.01); *F01P 3/20* (2013.01); *F28D 20/0056* (2013.01);
(Continued)

(58) Field of Classification Search
CPC .......... F28D 20/02; F28D 20/0056; F28D 2020/0078; F28D 2021/008; F01N 5/02;
(Continued)

(56) References Cited

U.S. PATENT DOCUMENTS 3,986,665 A *  10/1976  Kofink .................. B60H 1/20
                                                    237/12.3 A
4,140,173 A *  2/1979   Wulf ..................... B60H 1/20
                                                    165/10
(Continued)

FOREIGN PATENT DOCUMENTS

JP     6-143981     5/1994
JP     6-173679     6/1994
(Continued)

OTHER PUBLICATIONS

Fuse, et al., U.S. Appl. No. 15/329,608, titled: "Energy Management System", filed Jan. 27, 2017 (26 pages).
(Continued)

*Primary Examiner* — Ljiljana V. Ciric
(74) *Attorney, Agent, or Firm* — Nixon & Vanderhye PC (57) ABSTRACT

A heat storage system has a heat source that generates heat and releases the heat to a first heat medium and a heat storage body that stores heat. The heat storage body changes to a first phase in a solid state when a temperature of the heat storage body is lower than or equal to a phase transition temperature, and changes to a second phase in a solid state when a temperature of the heat storage body exceeds the phase transition temperature. The heat storage body stores or releases heat due to a phase transition between the first phase and the second phase. A mode of operation of the heat storage body is switchable between a heat storage mode in which the heat storage body stores heat of the first heat medium and a heat release mode in which the heat storage body releases the heat stored in the heat storage body to a heat transfer target.

12 Claims, 4 Drawing Sheets

(51) Int. Cl.
*F01N 3/20* (2006.01)
*F28D 20/00* (2006.01)

(52) U.S. Cl.
CPC ....... *B60Y 2200/92* (2013.01); *F01N 2610/10* (2013.01); *F01P 2060/04* (2013.01); *F28D 2020/0078* (2013.01)

(58) Field of Classification Search
CPC ... F01N 3/206; F01N 3/20; F01N 3/24; F01N 2610/10; F28F 7/02; F28F 21/081; B60H 1/00492; B60H 2200/92; F01P 3/20; F01P 2060/04; Y02E 60/145; Y02E 60/142
See application file for complete search history.

(56) References Cited

U.S. PATENT DOCUMENTS

| | | | | |
|---|---|---|---|---|
| 4,250,866 A * | 2/1981 | Telkes | F24H 3/025 | 110/101 C |
| 4,415,118 A | 11/1983 | Endo | | |
| 4,556,171 A * | 12/1985 | Fukami | B60H 1/00492 | 123/142.5 R |
| 4,579,170 A * | 4/1986 | Moses | F25D 3/00 | 165/104.17 |
| 4,609,036 A * | 9/1986 | Schrader | F28D 20/021 | 126/618 |
| 4,655,051 A * | 4/1987 | Jones | F25B 13/00 | 62/324.4 |
| 4,696,338 A * | 9/1987 | Jensen | F28D 20/025 | 165/10 |
| 4,709,750 A * | 12/1987 | White | F28D 20/021 | 126/400 |
| 4,798,059 A * | 1/1989 | Morita | F25B 13/00 | 165/902 |
| 4,807,696 A * | 2/1989 | Colvin | F28D 20/023 | 126/400 |
| 4,893,476 A * | 1/1990 | Bos | F24D 11/0214 | 62/79 |
| 4,922,998 A * | 5/1990 | Carr | B60H 1/3201 | 165/10 |
| 4,949,779 A * | 8/1990 | Kenny | B60H 1/00885 | 165/140 |
| 4,951,739 A * | 8/1990 | Cates | F28D 20/026 | 126/400 |
| 4,977,952 A * | 12/1990 | Schatz | B60H 1/00492 | 123/41.14 |
| 4,977,953 A * | 12/1990 | Yamagishi | C09K 5/063 | 126/263.01 |
| 4,993,481 A * | 2/1991 | Kamimoto | C04B 38/0006 | 126/643 |
| 5,005,371 A * | 4/1991 | Yonezawa | F24D 11/02 | 62/238.6 |
| 5,054,540 A * | 10/1991 | Carr | B60H 1/3201 | 165/10 |
| 5,165,466 A * | 11/1992 | Arbabian | F24D 11/00 | 165/10 |
| 5,199,484 A * | 4/1993 | Schatz | B60H 1/00492 | 165/10 |
| 5,211,334 A * | 5/1993 | Schatz | B60H 1/00492 | 126/617 |
| 5,222,298 A * | 6/1993 | Schatz | F28D 20/021 | 165/10 |
| 5,237,832 A * | 8/1993 | Alston | F24F 5/0017 | 165/134.1 |
| 5,277,038 A * | 1/1994 | Carr | B60H 1/00492 | 165/10 |
| 5,299,630 A * | 4/1994 | Schatz | F01P 11/20 | 123/41.14 |
| 5,407,130 A * | 4/1995 | Uyeki | B60H 1/00492 | 165/42 |
| 5,412,869 A * | 5/1995 | Boltz | B21C 37/0803 | 29/890.032 |
| 5,419,876 A * | 5/1995 | Usui | B01D 53/9454 | 422/177 |
| 5,553,662 A * | 9/1996 | Longardner | B60H 1/00492 | 165/10 |
| 5,555,932 A * | 9/1996 | Dudley | B60R 13/0861 | 165/10 |
| 5,950,708 A * | 9/1999 | Schatz | F28D 20/02 | 123/41.14 |
| 5,957,193 A * | 9/1999 | Kanada | B60H 1/00314 | 165/10 |
| 6,059,016 A * | 5/2000 | Rafalovich | B60H 1/00492 | 165/10 |
| 6,393,861 B1 * | 5/2002 | Levenduski | F25B 39/04 | 165/10 |
| 6,408,633 B1 * | 6/2002 | Carr | B60H 1/3202 | 62/99 |
| 6,568,205 B2 * | 5/2003 | Bureau | B60H 1/00321 | 62/244 |
| 6,668,567 B2 * | 12/2003 | Levenduski | F25B 39/04 | 62/185 |
| 6,742,352 B2 * | 6/2004 | Kampf | B60H 1/00328 | 165/104.21 |
| 7,096,929 B2 * | 8/2006 | Clarksean | F24F 5/0017 | 165/10 |
| 7,147,071 B2 * | 12/2006 | Gering | B60H 1/00278 | 237/12.3 B |
| 7,225,860 B2 * | 6/2007 | Baginski | F28D 7/16 | 126/400 |
| 7,246,506 B2 * | 7/2007 | Takao | C09K 5/00 | 62/430 |
| 7,260,940 B2 * | 8/2007 | Watanabe | F25B 23/00 | 62/114 |
| 7,464,672 B2 * | 12/2008 | Vetrovec | F01P 11/20 | 123/41.14 |
| 7,637,031 B2 * | 12/2009 | Salim | B60H 3/0085 | 34/437 |
| 7,640,967 B2 * | 1/2010 | Bradley | F01P 3/22 | 123/553 |
| 7,669,647 B2 * | 3/2010 | Tsubone | B60H 1/00492 | 123/142.5 R |
| 7,735,461 B2 * | 6/2010 | Vetrovec | F01P 11/20 | 123/41.01 |
| 8,220,284 B2 * | 7/2012 | Tsubone | B60H 1/00492 | 165/10 |
| 8,272,432 B2 * | 9/2012 | Major | B60H 1/00492 | 165/10 |
| 8,517,087 B2 * | 8/2013 | Zeigler | B60H 1/00907 | 165/202 |
| 8,662,226 B2 * | 3/2014 | Varns | B60H 1/00014 | 180/68.5 |
| 8,794,195 B2 * | 8/2014 | Levin | F02G 5/02 | 123/41.1 |
| 8,863,702 B2 * | 10/2014 | Schatz | F01P 3/00 | 123/41.44 |
| 9,074,826 B2 * | 7/2015 | Haupts | F28D 20/00 | |
| 9,140,500 B2 * | 9/2015 | Goto | F02G 5/00 | |
| 9,400,510 B2 * | 7/2016 | Wang | G05D 23/19 | |
| 9,464,837 B2 * | 10/2016 | Wang | F25B 49/022 | |
| 9,568,235 B2 * | 2/2017 | Dobbs | F24F 5/0021 | |
| 9,587,546 B2 * | 3/2017 | Hussain | F01N 5/02 | |
| 9,618,242 B2 * | 4/2017 | Lombardo | F25B 30/02 | |
| 9,671,171 B2 * | 6/2017 | Xiang | C09K 5/063 | |
| 9,676,308 B2 * | 6/2017 | Zhang | B60N 2/5621 | |
| 9,719,688 B2 * | 8/2017 | Holloway | F24F 5/0017 | |
| 9,821,630 B2 * | 11/2017 | Goenka | B60H 1/005 | |
| 9,840,130 B2 * | 12/2017 | Connell | B60H 1/3202 | |
| 9,873,305 B2 * | 1/2018 | Bank | B60H 1/00492 | |
| 9,914,339 B2 * | 3/2018 | Goenka | B60H 1/22 | |
| 9,944,150 B2 * | 4/2018 | Sutherland | B60H 1/00392 | |
| 10,001,327 B2 * | 6/2018 | Fuse | C09K 5/02 | |
| 10,279,657 B2 * | 5/2019 | Fuse | B60W 10/30 | |
| 2011/0067419 A1 | 3/2011 | Aoyagi | | |
| 2011/0219771 A1 * | 9/2011 | Stiesdal | F28D 20/021 | 60/670 |
| 2012/0152487 A1 * | 6/2012 | Styles | F01N 5/02 | 165/10 |

(56) References Cited

U.S. PATENT DOCUMENTS

| | | | | |
|---|---|---|---|---|
| 2012/0216981 A1* | 8/2012 | Bank | ................... | C09K 5/063 |
| | | | | 165/10 |
| 2012/0227926 A1* | 9/2012 | Field | ................... | F24D 11/003 |
| | | | | 165/10 |
| 2012/0273920 A1* | 11/2012 | Fedorov | ................ | H01L 23/373 |
| | | | | 257/532 |
| 2017/0282893 A1* | 10/2017 | Teraya | .................. | B60K 6/445 |
| 2017/0354190 A1* | 12/2017 | Cauchy | ................. | A47C 7/744 |
| 2019/0148616 A1* | 5/2019 | Nakagawa | .............. | F28D 20/02 |
| | | | | 136/205 |

FOREIGN PATENT DOCUMENTS

| | | | | |
|---|---|---|---|---|
| JP | 2005-213368 | | 8/2005 | |
| JP | 2010-053830 | | 3/2010 | |
| JP | 2010-163510 | | 7/2010 | |
| JP | 2011-094564 | | 5/2011 | |
| JP | 2013-108748 | | 6/2013 | |
| WO | WO-2016017083 A1 * | | 2/2016 | ............ B60W 10/30 |

OTHER PUBLICATIONS

U.S. Appl. No. 15/329,617, filed Jan. 27, 2017, Heat Storage System.
U.S. Appl. No. 15/329,608, filed Jan. 27, 2017, Energy Management System.

* cited by examiner

HEAT STORAGE SYSTEM

CROSS REFERENCE TO RELATED APPLICATION

This application is the U.S. national phase of International Application No. PCT/JP2015/003480 filed Jul. 9, 2015, which designated the U.S. and claims priority to Japanese Patent Application No. 2014-153726 filed on Jul. 29, 2014, the entire contents of each of which are incorporated herein by reference.

TECHNICAL FIELD

The present disclosure relates to a heat storage system.

BACKGROUND ART

In a vehicle having an engine (i.e., an internal combustion engine) as an energy converter, a temporal and a spatial gap tend to occur in each of a stationary condition in which an excess heat is generated and a starting condition in which heat is required. Accordingly, a heat storage system that stores a part of heat radiated from the engine in the stationary condition and releases the heat stored therein in the starting condition is proposed.

For example, a heat storage system that stores heat in a sensible heat storage body using a specific heat of a matter, and a heat storage system that stores heat in a sensible heat storage body using a sensible heat generated due to a liquid-solid phase transition of a matter are known. In addition, a heat storage system that stores heat in a chemical heat storage body using a heat of chemical reaction is known (for example, refer to Patent Literature 1).

PRIOR ART LITERATURES

Patent Literature

Patent Literature 1: JP 2013-108748 A

SUMMARY OF INVENTION

However, in the heat storage system using the sensible heat storage body, it is generally difficult to store heat densely since a heat storage amount depending on a heat capacity of the heat storage body is small. As a result, a size may be large when configuring a sensible heat storage system to meet a heat storage amount and a heat radiation amount required for the system.

In addition, a heat storage system using the sensible heat storage body can store heat, in addition to the sensible heat, by using an enthalpy in a phase transition between a liquid phase and a solid phase. However, a container (i.e., a retainer) that houses liquid is necessary.

The container may increase a heat resistance between the heat storage body and a heat source or between the heat storage body and a heat transfer target. Furthermore, a space in which nothing is disposed when being mounted, in other words, a dead space may be provided. That is, in the heat storage system using the sensible heat storage body, an advantage enabling a use of the enthalpy in the phase transition is canceled by a disadvantage requiring the container.

The heat storage system using the chemical heat storage body can store heat, in addition to sensible heat and latent heat, using an enthalpy in a chemical reaction. A reaction speed of the chemical reaction, generally, heavily depends on a temperature. A high temperature is thereby required for a quick proceed of the chemical reaction.

As a result, it may be difficult to store heat densely since the chemical reaction hardly proceeds in the heat storage body when a temperature of the heat source (i.e., the engine) is low. That is, the heat storage system using the chemical heat storage body may not receive the advantage enabling the use of the enthalpy in the chemical reaction depending on a temperature of the heat source.

The present disclosure addresses the above matters, and it is an objective of the present disclosure to provide a heat storage system in which a retainer for retaining a heat storage body is omitted and thereby a size can be reduced, and with which heat can be stored densely regardless of a temperature of a heat source.

A heat storage system of the present disclosure has a heat source that generates heat and releases the heat to a first heat medium and a heat storage body that stores heat. The heat storage body changes to a first phase in a solid state when a temperature of the heat storage body is lower than or equal to a phase transition temperature, and changes to a second phase in a solid state when a temperature of the heat storage body exceeds the phase transition temperature. The heat storage body stores or releases heat due to a phase transition between the first phase and the second phase. A heat storage mode in which the heat storage body stores heat of the first heat medium and a heat release mode in which the heat storage body releases the heat stored in the heat storage body to a heat transfer target are switchable.

According to the above-described configuration, the heat storage body stores or releases heat due to the phase transition between the first phase in the solid state and the second phase in the liquid state, such that the heat storage body can be kept in the solid state both in the first phase and the second phase. As a result, a retainer for retaining the heat storage body can be omitted.

Moreover, the heat storage body stores heat due to the phase transition between the first phase in the solid state and the second phase in the solid state, and thereby the heat storage body can store heat more densely as compared to a sensible heat storage body. As a result, a size of the heat storage system can be decreased.

Furthermore, the heat storage body can store heat densely as well when a temperature of the heat source is low since the heat storage body stores or releases heat without using a chemical reaction. That is, the heat storage body can store heat densely regardless of a temperature of the heat source.

DESCRIPTION OF EMBODIMENTS

Embodiments of the present disclosure will be described hereafter referring to drawings. In the embodiments, a part that corresponds to or equivalents to a matter described in a preceding embodiment may be assigned with the same reference number.

First Embodiment

A first embodiment of the present disclosure will be described hereafter referring to FIG. 1 and FIG. 2. According to the present embodiment, a heat storage system of the present disclosure is applied to a heat storage system that stores heat of an exhaust gas from an engine (i.e., an internal combustion engine) used as one of driving power sources for a hybrid car (i.e., a vehicle).

Figure 1:
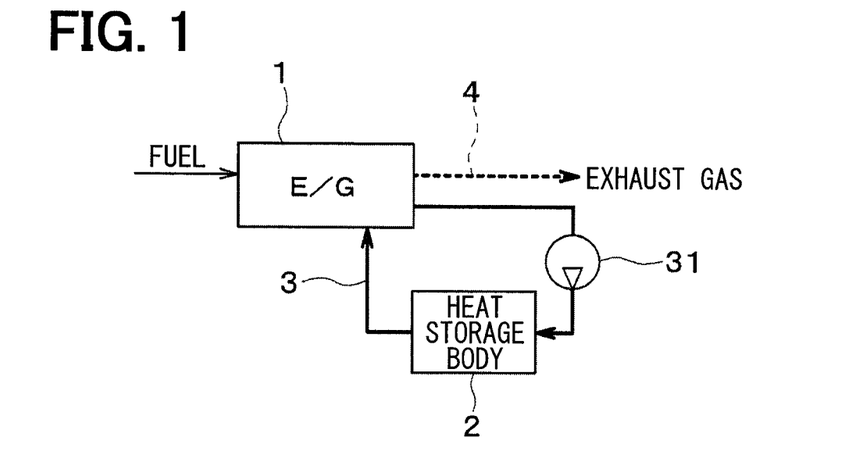
FIG. 1 is a diagram illustrating a whole configuration of a heat storage system according to a first embodiment.
Figure 2:
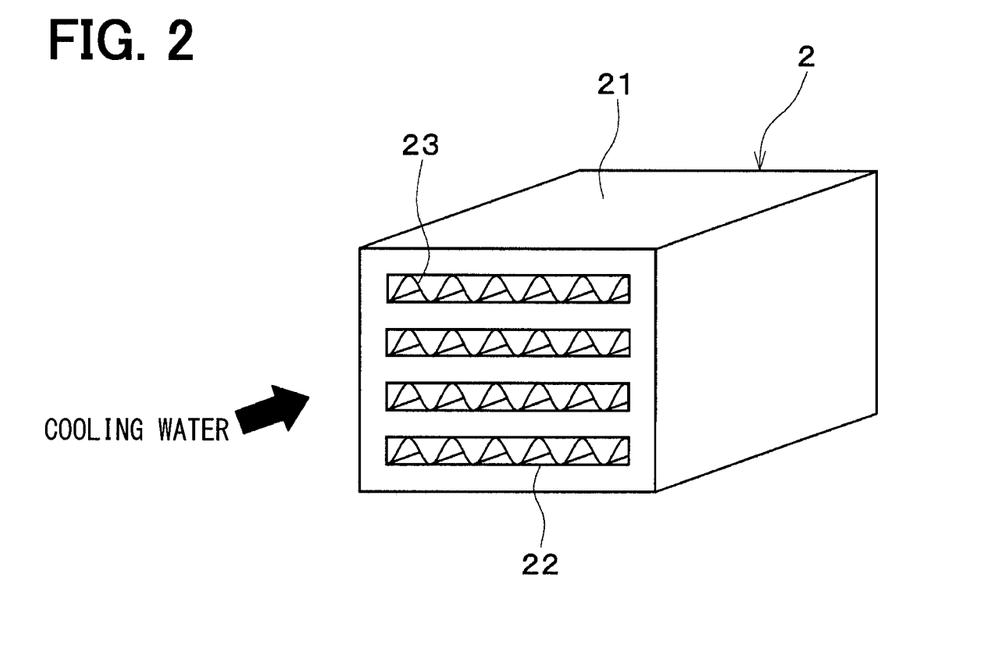
FIG. 2 is a schematic perspective view illustrating a heat storage body according to the first embodiment.

As shown in FIG. 1, the heat storage system of the present embodiment is configured as a system that transfers heat from an engine 1 to a heat storage body 2 through a cooling water and stores the heat in the heat storage body 2.

The engine 1 corresponds to a heat source of the present disclosure. The engine 1 is an energy converter that releases heat to the cooling water when converting a fuel, which is supply energy from an outside, into power, which is energy in another form. The cooling water is liquid that receives or supplies heat between the cooling water and the engine 1. The cooling water corresponds to a first heat medium.

The engine 1 and the heat storage body 2 are connected to each other by a cooling water passage 3 that provides a closed circuit between the engine 1 and the heat storage body 2. A first pump 31, which is a mechanical pump or an electronic pump, is disposed in the cooling water circuit 3 and circulates the cooling water in the cooling water circuit 3. The cooling water in the cooling water circuit 3 circulates from a cooling water outlet of the engine 1 to a cooling water inlet of the engine 1 via the heat storage body 2. The cooling water circuit 3 of the present embodiment corresponds to a first heat medium passage of the present disclosure.

The engine 1 is connected with an exhaust passage 4 in which exhaust gas that is a gas discharged from the engine 1 flows.

The heat storage body 2 stores heat of the cooling water that has a high temperature by exchanging heat with the exhaust gas from the engine 1. Specifically, the heat storage body 2 is made of a heat storage material that changes to a first phase in a solid state when a temperature of the heat storage body 2 is lower than or equal to a phase transition temperature, and changes to a second phase in a solid state when a temperature of the heat storage body 2 exceeds the phase transition temperature. That is, the heat storage body 2 is made of a material that is in a solid state both in the first phase and the second phase. The heat storage body 2 stores heat or releases heat due to a phase transition between the first phase and the second phase.

The material configuring the heat storage body 2 according to the present embodiment will be described hereafter. The heat storage body 2 is made of a strongly correlated electron system compound in which a coulomb interaction affects strongly between electrons of the material.

According to the present embodiment, the strongly correlated electron system compound configuring the heat storage body 2 is a material, such as vanadium dioxide, that includes at least a transition metal and oxygen. The strongly correlated electron system compound configuring the heat storage body 2 may be a compound shown in the following general expression F1.

$$M_{1-x}N_xO_y \qquad \text{F1}$$

In the general expression F1, M and N are different transition metals.

M in the general expression F1 may be vanadium. N in the general expression F1 may be one transition metal selected from a group of tungsten, rhenium, molybdenum, ruthenium, niobium, and tantalum. The phase transition temperature of the heat storage body 2 can be set to be a required temperature by adding a specified amount of a metallic element such as tungsten to vanadium dioxide as described above.

A configuration of the heat storage body 2 according to the present embodiment will be described hereafter. As shown in FIG. 2, the heat storage body 2 of the present embodiment is configured to have a body portion 21 that has a block shape and is made of the above-described heat storage material.

The body portion 21 is provided with cooling water circulation holes 22 in which the cooling water flows. The cooling water circulation holes 22 therein have first fins 23 respectively as a heat transfer part. According to the present embodiment, the first fins 23 are a corrugated fin that has a corrugated shape in a cross section perpendicular to a flow direction of the cooling water. The corrugated shape has protruding portions of which tips are located on one side and the other side alternately. The first fins 23 increase a heat transfer area transferring heat between the cooling water, and thereby promotes a heat exchange between the cooling water and the heat storage material.

As shown in FIG. 1, the heat storage system of the present embodiment is switchable between a heat storage mode in which the heat storage body 2 stores heat of the cooling water and a heat release mode in which the heat storage body 2 releases the heat to the engine 1.

Specifically, in the heat storage mode, exhaust heat from the engine 1 is stored in the heat storage body 2 through the cooling water flowing in the cooling water passage 3. That is, the heat storage body 2, in the heat storage mode, stores heat of the cooling water that has a high temperature by exchanging heat with the engine 1.

The heat storage body 2, in the heat release mode, releases the heat to the engine 1 through the cooling water flowing in the cooling water passage 3. That is, the cooling water heated by exchanging heat with the heat storage body 2 releases the heat to the engine 1. Accordingly, the engine 1 corresponds to a heat transfer target of the present disclosure according to the present embodiment.

According to the present embodiment, the heat storage body 2 can store exhaust heat, which is discharged from the engine 1 and has a high temperature, by performing the heat storage mode in a stationary condition in which an excess heat is generated. The heat stored in the heat storage body 2 can be used for heating the engine 1 by performing the heat release mode in a starting condition in which heat is required.

A switching between the heat storage mode and the heat release mode can be performed by, for example, the following method. That is, the heat storage mode is performed when a cooling water temperature detected at an outlet side of the engine 1 is higher than or equal to a predetermined base temperature, and the heat release mode is performed when the cooling water temperature detected at the outlet side is lower than the base temperature.

As described above, the heat storage body stores heat or releases heat due to the phase transition between the first phase in a solid state and the second phase in a solid state. Therefore, a retainer such as a container for supporting the heat storage material can be omitted since the heat storage body can be kept in a solid state both in the first phase and the second phase.

In addition, the heat storage body 2 can store heat densely as compared to a sensible heat storage material since the heat storage body 2 stores heat due to the phase transition between the first phase in a solid state and the second phase in a solid state. As a result, a size of the heat storage system, specifically, a size of the heat storage body 2 can be smaller.

Moreover, the heat storage body 2 can store heat even in a case that the engine 1 has a low temperature, since the heat storage body 2 stores or releases heat without using a chemical reaction. That is, the heat storage body 2 can store heat densely regardless of a temperature of the engine 1 that is a heat source.

Second Embodiment

A second embodiment of the present disclosure will be described referring to FIG. 3. The second embodiment is different from the first embodiment in a point that heat stored in the heat storage body 2 is used to heat air for an air conditioning that is air blown into a vehicle compartment (i.e., used for a heating performance).

Figure 3:
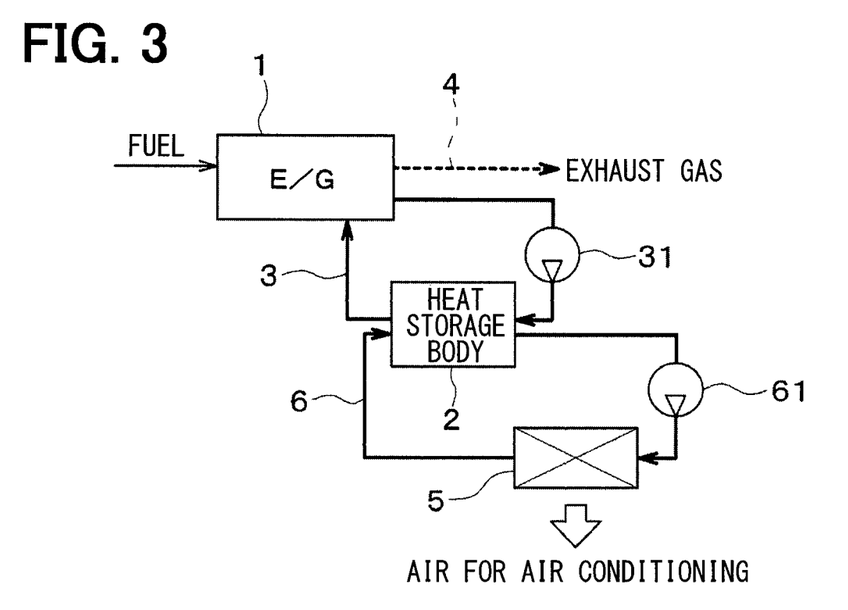
FIG. 3 is a diagram illustrating a whole configuration of a heat storage system according to a second embodiment.

As shown in FIG. 3, a heat storage system of the present embodiment has a heat medium passage 6 in which a heat medium flows. That is, a heater core 5 and the heat storage body 2 are connected to each other by the heat medium passage 6 that configures a closed circuit between the heater core 5 and the heat storage body 2. The heat medium is liquid and receives or supplies heat between the heat medium and each of the heat storage body 2 and the heater core 5. The heat medium corresponds to a second heat medium of the present disclosure.

The heat medium passage 6 provides a circuit separately from the cooling water passage 3. A second pump, which is a mechanical pump or a electronic pump, is disposed in the heat medium passage 6 and circulates the heat medium in the heat medium passage 6. The heat medium passage 6 of the present embodiment corresponds to a second heat medium passage of the present disclosure.

The heater core 5 is a heat exchanger that heats the air for air conditioning by performing a heat exchange between the heat medium heated by heat stored in the heat storage body 2 and the air for air conditioning blown from a blower (not shown). The heater core 5 may be a fin-and-tube type heat exchanger that heats the air for air conditioning by performing a heat exchange between the heat medium flowing in a tube and the air for air conditioning flowing outside the tube.

According to the present embodiment, the heat storage body 2, in the heat release mode, releases heat stored in the heat storage body 2 to the air for air conditioning flowing in the heater core 5 through the heat medium flowing in the heat medium passage 6. In addition, the heat storage body 2 releases heat stored in the heat storage body 2 to the engine 1 through the cooling water flowing in the cooling water passage 3. That is, the heat storage body 2, in the heat release mode, releases the heat stored in the heat storage body 2 to both of the engine 1 and the air for air conditioning. Accordingly, both of the engine 1 and the air for air conditioning according to the present embodiment correspond to a heating target (i.e., the heat transfer target) of the present disclosure.

According to the present embodiment, the heat storage body 2 can store the exhaust heat that is discharged from the engine 1 and has a high temperature through the cooling water by performing the heat storage mode in the stationary condition, in other words, in a condition in which excess heat is generated. The heat stored in the heat storage body 2 can be used for both of a heating of the engine 1 and a heating performance for the vehicle compartment by performing the heat release mode in the starting condition, in other words, in a condition in which heat is required.

Other configurations and operations are the same as that of the first embodiment. Therefore, according to the heat storage system of the present embodiment, the same effects as the first embodiment can be obtained.

Third Embodiment

A third embodiment of the present disclosure will be described hereafter referring to FIG. 4. The third embodiment is different from the first embodiment in a point that the heat storage body 2 stores heat of the exhaust gas from the engine 1.

Figure 4:
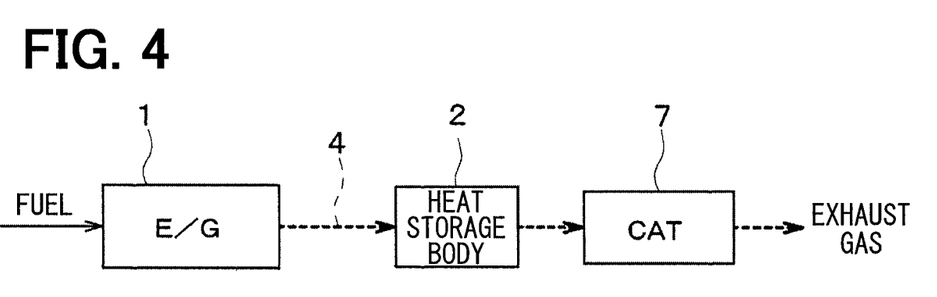
FIG. 4 is a diagram illustrating a whole configuration of a heat storage system according to a third embodiment.

As shown in FIG. 4, the heat storage body 2 of the present embodiment is arranged in an exhaust passage 4. The heat storage body 2 thereby stores heat of the exhaust gas that is a gas discharged from the engine 1. That is, the heat storage body 2 stores heat of the exhaust gas from the engine 1 through the exhaust gas. Thus, according to the present embodiment, the exhaust gas corresponds to the first heat medium of the present disclosure.

A catalytic agent 7 for cleaning the exhaust gas is arranged in the exhaust passage 4 on a downstream side of the heat storage body 2. Specifically, the heat storage body 2 and the catalytic agent 7 are arranged inside an exhaust tube that configures the exhaust passage 4.

According to the present embodiment, the heat storage body 2, in the heat storage mode, stores heat of the exhaust gas from the engine 1 through the exhaust gas flowing in the exhaust passage 4. That is, the heat storage body 2, in the heat storage mode, stores heat of the exhaust gas that is discharged from the engine 1 and has a high temperature.

The heat storage body 2, in the heat release mode, releases the heat stored in the heat storage body 2 to the catalytic agent 7 through the exhaust gas flowing in the exhaust passage 4. That is, heat of the exhaust gas heated by exchanging heat with the heat storage body 2 is transferred to the catalytic agent 7. Accordingly, the catalytic agent 7 corresponds to the heating target (i.e., the heat transfer target) of the present disclosure according to the present embodiment.

According to the present embodiment, the heat storage body 2 can store heat of the exhaust gas that is discharged from the engine 1 and has a high temperature through the exhaust gas by performing the heat storage mode in the stationary condition, in other words, in the condition in which excess heat is generated. The heat stored in the heat storage body 2 can be used for heating the catalytic agent 7 by performing the heat release mode in the starting condition, in other words, in the condition in which heat is required.

Other configurations and operations are the same as that of the first embodiment. Therefore, according to the heat storage system of the present embodiment, the same effects as the first embodiment can be obtained.

Fourth Embodiment

A fourth embodiment of the present disclosure will be described referring to FIG. 5. The fourth embodiment is different from the above-described third embodiment in a point that the heat storage body 2 releases heat stored therein to the engine 1 through the exhaust gas.

Figure 5:
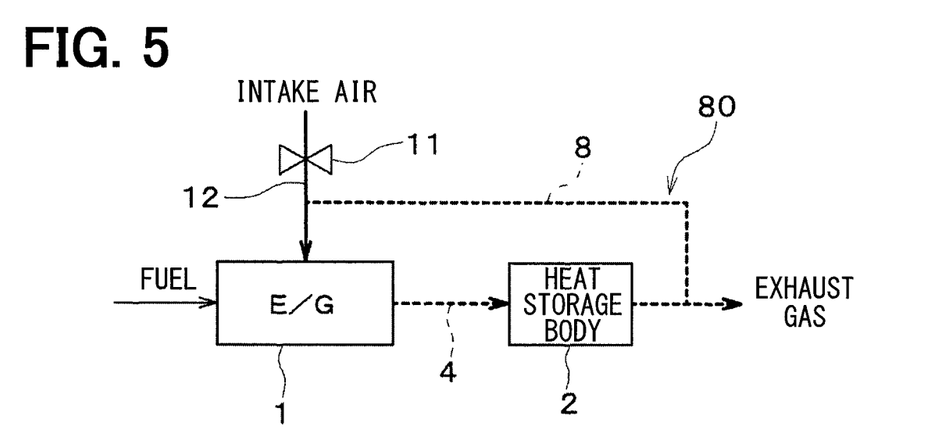
FIG. 5 is a diagram illustrating a whole configuration of a heat storage system according to a fourth embodiment.

As shown in FIG. 5, the vehicle of the present embodiment has an EGR (i.e., an exhaust gas recirculation) device 80 that reduces a pumping loss generated in a throttle valve 11 by circulating a part of the exhaust gas from the engine 1 to a suction side. An EGR passage 8 for circulating a part of the exhaust gas to the suction side connects a downstream side of the heat storage body 2 in the exhaust passage 4 and a downstream side of the throttle valve 11 in an intake passage 12 to each other.

According to the present embodiment, the heat storage body 2, in the heat release mode, releases heat stored in the heat storage body 2 to the engine 1 through the exhaust gas flowing in the exhaust passage 4 and the EGR passage 8. That is, heat of the exhaust gas heated by exchanging heat with the heat storage body 2 is transferred to the engine 1 in the heat release mode. Accordingly, the engine 1 corresponds to the heat transfer target of the present disclosure according to the present embodiment.

According to the present embodiment, the heat storage body 2 can store heat of the exhaust gas, which is discharged from the engine 1 and has a high temperature, through the exhaust gas by performing the heat storage mode in the stationary condition, in other words, in the condition in which excess heat is generated. The heat stored in the heat storage body 2 can be used for heating the engine 1 by performing the heat release mode in the starting condition, in other words, in the condition in which heat is required.

Other configurations and operations are the same as the third embodiment. Therefore, the heat storage system of the present embodiment can obtain the same effects as the third embodiment.

Fifth Embodiment

A fifth embodiment of the present disclosure will be described hereafter referring to FIG. 6 and FIG. 7. The fifth embodiment is different from the third embodiment in a point that the heat storage body 2 releases heat stored therein to the engine 1 through the cooling water.

Figure 6:
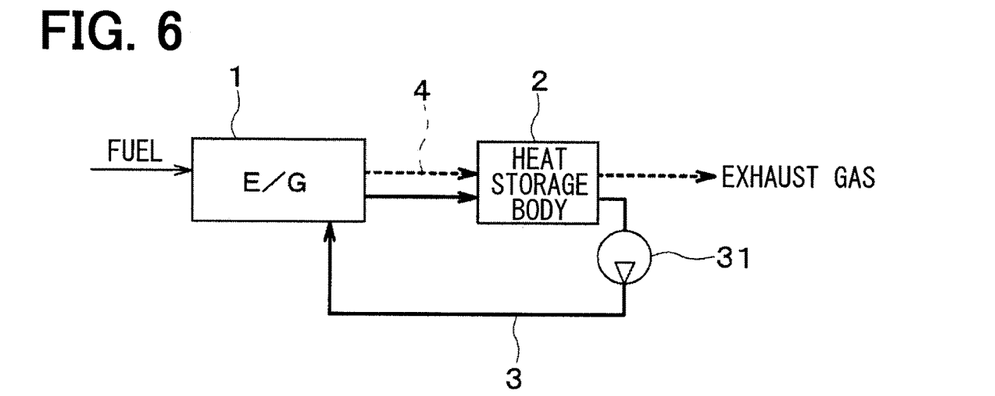
FIG. 6 is a diagram illustrating a whole configuration of a heat storage system according to a fifth embodiment.

As shown in FIG. 6, the engine 1 and the heat storage body 2 are connected to each other by the cooling water passage 3 that provides a closed circuit between the engine 1 and the heat storage body 2. The cooling water passage 3 provides a circuit (i.e., a passage) separately from the exhaust passage 4. The first pump 31 is disposed in the cooling water passage 3.

The cooling water corresponds to the second heat medium of the present disclosure, and the cooling water passage 3 corresponds to the second heat medium passage of the present disclosure, according to the present embodiment. The exhaust passage 4 corresponds to the first heat medium passage of the present disclosure according to the present embodiment.

According to the present embodiment, heat stored in the heat storage body 2 is transferred to the engine 1 through the cooling water flowing in the cooling water passage 3 in the heat release mode. That is, heat of the cooling water heated by exchanging heat with the heat storage body 2 is transferred to the engine 1 in the heat release mode. Accordingly, the engine 1 corresponds to the heat transfer target of the present disclosure according to the present embodiment.

Figure 7:
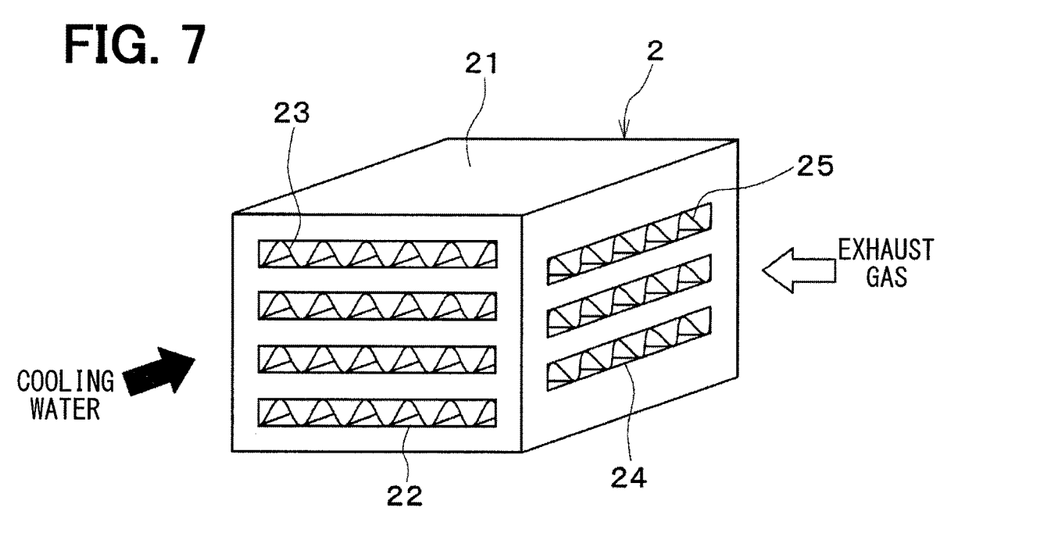
FIG. 7 is a schematic perspective view illustrating a heat storage body according to the fifth embodiment.

As shown in FIG. 7, the heat storage body 2 of the present embodiment has the body portion 21 that is provided with exhaust circulation holes 24 in which the exhaust gas flows. The exhaust circulation holes 24 are provided such that a flow direction of the exhaust gas flowing in the exhaust circulation holes 24 is perpendicular to the flow direction of the cooling water flowing in the cooling water circulation holes 22. The exhaust circulation holes 24 and the cooling water circulation holes 22 are arranged alternatively in an arrangement direction (i.e., an up-down direction of a paper having FIG. 7) in which the exhaust circulation holes 24 are arranged, in other words, in an arrangement direction in which the cooling water circulation holes 22 are arranged.

Second fins 25 as a heat transfer part are disposed in the exhaust circulation holes 24 respectively. According to the present embodiment, the second fins 25 are a corrugated fin that has a corrugated shape in a cross section perpendicular to the flow direction of the exhaust gas. The corrugated shape has protruding portions of which tips are located on one side and the other side alternately. The second fins 25 increase a heat transfer area transferring heat between the exhaust gas, and thereby promote a heat exchange between the exhaust gas and the heat storage material.

According to the present embodiment, the heat storage body 2 can store heat of the exhaust gas, which is discharged from the engine 1 and has a high temperature, through the exhaust gas by performing the heat storage mode in the stationary condition, in other words, in the condition in which excess heat is generated. The heat stored in the heat storage body 2 can be used for heating the engine 1 through the cooling water by performing the heat release mode in the starting condition, in other words, in the condition in which heat is required.

Thus, according to the heat storage system of the present embodiment, the heat storage body 2 can store heat of the exhaust gas having a high temperature (e.g., about 400° C.), and the heat can be transferred to the cooling water having a low temperature (e.g., about 80° C.). As a result, a heat storage efficiency of the heat storage body 2 can be improved.

Other configurations and operations are the same as the third embodiment. Therefore, the heat storage system of the present embodiment can obtain the same effects as the third embodiment.

Sixth Embodiment

A sixth embodiment of the present disclosure will be described hereafter referring to FIG. 8. The sixth embodiment is different from the first embodiment in a configuration of the heat storage body 2.

Figure 8:
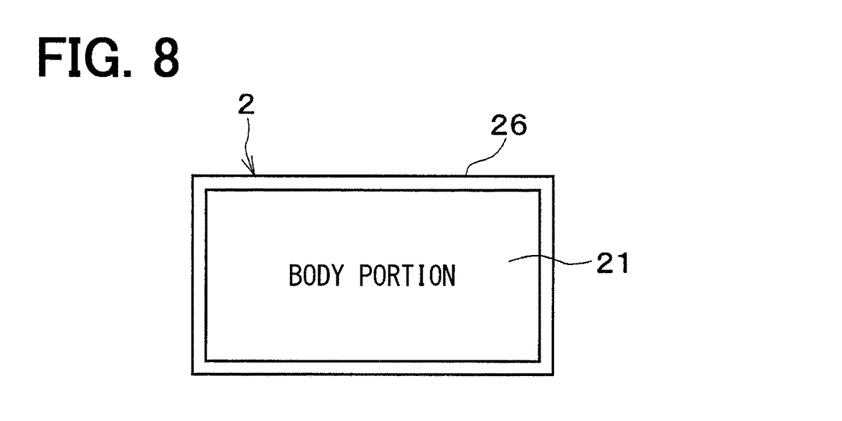
FIG. 8 is a schematic diagram illustrating a heat storage body according to a sixth embodiment.

As shown in FIG. 8, the heat storage body 2 has a body portion (i.e., a heat storage layer) 21 that is made of a strongly correlated electron system compound and a high heat conductivity layer 26 that covers the body portion 21. The high heat conductivity layer 26 is configured by a metal that has greater heat conductivity relative to a heat storage material configuring the body portion 21. According to the present embodiment, the body portion 21 is made of $VO_2$, and the high heat conductivity layer 26 is made of $V_2O_3$.

According to the present embodiment, a heat transfer between the heat storage material and the cooling water can be promoted by covering the heat storage material with a high heat conductivity layer 26 having great heat conductivity. As a result, the heat storage body 2 can store heat or release heat promptly.

In addition, the high heat conductivity layer 26 can be easily formed in a required shape by configuring the high heat conductivity layer 26 by a material having a greater mechanical strength than a material configuring the body portion 21. Therefore, a surface area of the high heat conductivity layer 26 can be increased, and a heat exchange performance between the high heat conductivity layer 26 and the cooling water can be improved, by providing the high heat conductivity layer 26 to have, for example, a fin shape.

Seventh Embodiment

A seventh embodiment of the present disclosure will be described hereafter referring to FIG. 9. The seventh embodiment is different from the first embodiment in a configuration of the heat storage body 2.

Figure 9:
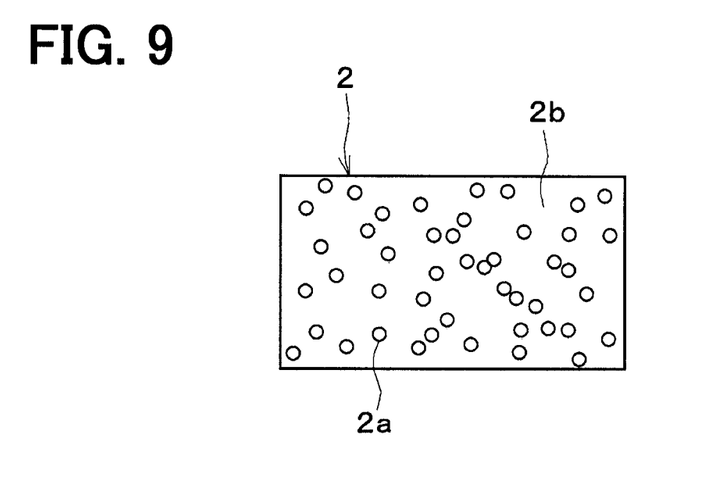
FIG. 9 is a schematic diagram illustrating a heat storage body according to a seventh embodiment.

As shown in FIG. 9, the heat storage body 2 is configured by a compound that includes a strongly correlated electron system compound 2a and a filler (i.e., a reinforcement member) 2b that is a inorganic compound. According to the present embodiment, the heat storage body 2 is configured by $VO_2$ and ceramics.

As a result, a mechanical strength of the heat storage body 2 can be improved. A heat storage amount of the heat storage body 2 can be changed by changing a compounding ratio between the strongly correlated electron system compound 2a and the filler 2b.

Eighth Embodiment

An eighth embodiment of the present disclosure will be described hereafter referring to FIG. 10. The eighth embodiment is different from the first embodiment in a configuration of the heat storage body 2.

Figure 10:
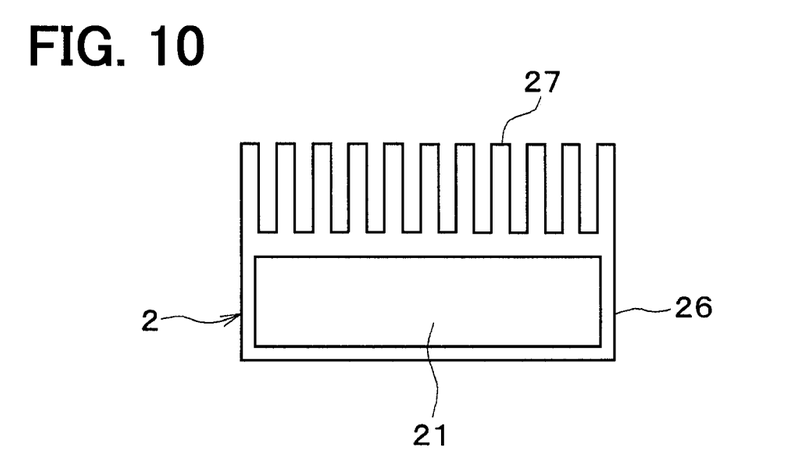
FIG. 10 is a schematic diagram illustrating a heat storage body according to an eighth embodiment.

As shown in FIG. 10, the heat storage body 2 has the body portion (i.e., a heat storage layer) 21 that is made of a strongly correlated electron system compound and a fin (i.e., a heat transfer part) 27 that increases a heat transfer area transferring heat between the body portion 21. The fin 27 is made of metal that has greater heat conductivity relative to the body portion 21.

The body portion 21 is covered with the high heat conductivity layer 26 that is made of metal having greater heat conductivity than the heat storage material configuring the body portion 21. The high heat conductivity layer 26 is made of the same material as the fin 27 and configured integrally with the fin 27. According to the present embodiment, the body portion 21 is made of $VO_2$, and the high heat conductivity layer 26 and the fin 27 are made of $V_2O_3$.

According to the present embodiment, a heat transfer area between in which heat is transferred between the heat storage body 2 and the cooling water can be increased, and a heat exchange performance between the heat storage body 2 and the cooling water can be improved, by providing the heat storage body 2 to have the fin 27.

(Other Modifications) It should be understood that the present disclosure is not limited to the above-described embodiments and intended to cover various modification within a scope of the present disclosure as described hereafter. Technical features disclosed in the above-described embodiments may be combined as required in a feasible range.

(1) The above-described embodiments is an example in which a corrugated fin is used as the first fin 23, however a shape of the first fin 23 is not limited to the example.

For example, the first fin 23 may be a straight fin that has a rectangular corrugated shape in a cross section perpendicular to the flow direction of the cooling water. Alternatively, the first fin 23 may be a waved fin in which a portion of the straight fin bent to have the rectangular corrugated shape is further bent toward the flow direction of the cooling water to have a crinkly shape. Alternatively, the first fin 23 may be an off-set fin in which the portion of the straight fin bent to have the rectangular corrugated shape has a notch, and in which the notch is bent intermittently.

Similarly, the above-described fifth embodiment is an example using a corrugated fin as the second fin 25. However, the second fin 25 is not limited to the example and may be the straight fin, the waved fin, or the off-set fin.

(2) The above-described second embodiment is an example in which the heat storage system is configured such that heat stored in the heat storage body 2 is transferred to both of the engine 1 and the air for air conditioning in the heat release mode. However, the heat transfer target in the heat release mode is not limited to the example. For example, the heat storage system may be configured such that heat stored in the heat storage body 2 is transferred to the air for air conditioning and is not transferred to the engine 1 in the heat release mode.

The above-described seventh embodiment is an example in which the heat storage body 2 is made of $VO_2$ and ceramics. However, the heat storage body 2 may be made to include another compound.

(4) The above-described second embodiment is an example in which the air for air conditioning is used as the heating target (i.e., the heat transfer target). However, for example, the heating target may be an AFT (i.e., Automatic Transmission Field) or engine oil.

(5) The above-described third embodiment is an example in which the catalytic agent 7 is the heating target (i.e., the heat transfer target), however the heating target is not limited to the example. For example, the heating target may be a DPF (i.e., Diesel Particulate Filter) that is disposed in the exhaust passage 4 of the engine 1.

(6) The above-described third embodiment is an example in which heat stored in the heat storage body 2 is transferred to the catalytic agent 7 through the exhaust gas, which is the first heat medium, in the heat release mode. However, the heat transfer target in the heat release mode is not limited to the example.

For example, the heat stored in the heat storage body 2 may be transferred to the catalytic agent 7 through a heat medium (i.e., the second heat medium) that is fluid other than the exhaust gas. In this case, a heat medium passage in which the heat medium flows may be provided separately from the exhaust passage 4.

(7) The above-described embodiments are an example in which the heat storage system of the present disclosure is applied to a vehicle heat storage system for a hybrid vehicle, however the heat storage system is not limited to that usage.

For example, the heat storage system may be applied to an air conditioner for an electric vehicle (including a fuel cell vehicle) that generates driving force for moving the vehicle by an electric motor for moving the vehicle, or to an air conditioner for a regular vehicle that generates driving force for moving the vehicle by an engine. In addition, the heat storage system of the present disclosure is not limited to be used in a vehicle and may be used for a stationary heat storage system.

The above-described embodiments are an example in which the engine as the energy converter is used as a heat source that generates heat and releases the heat to the first heat medium, however the heat source is not limited to the example. For example, the heat source may be an electric device such as a fuel cell or an electric motor for moving the vehicle when the heat storage system is applied to a vehicle heat storage system.

The invention claimed is:

1. A heat storage system comprising:
a heat source that is operable to generate heat and release the heat to a first heat medium;
a heat storage body that is operable to store the heat released from the heat source via the first heat medium; and
a flow passage through which the first heat medium can flow between the heat source and the heat storage body, wherein
the heat storage body is operable to change to a first phase in a solid state when a temperature of the heat storage body is lower than or equal to a phase transition temperature, and is operable to change to a second phase in a solid state when a temperature of the heat storage body exceeds the phase transition temperature,
the heat storage body is operable to store or release heat due to a phase transition between the first phase and the second phase, and
wherein a mode of operation of the heat storage body is switchable between a heat storage mode in which the heat storage body stores heat of the first heat medium and a heat release mode in which the heat storage body releases the heat stored in the heat storage body to a heat transfer target.

2. The heat storage system according to claim 1, the heat storage system being disposed in a vehicle, wherein
the heat source is an energy converter that is operable to release heat to the first heat medium when converting an energy supplied from outside of the vehicle into driving energy for running the vehicle.

3. The heat storage system according to claim 2, wherein the first heat medium is a liquid that can receive heat from or supply heat to the energy converter.

4. The heat storage system according to claim 2, wherein the first heat medium is a gas that can be discharged from the energy converter.

5. The heat storage system according to claim 3, wherein the heat transfer target is the energy converter, and
the heat storage body is configured to release heat stored in the heat storage body to the energy converter through the first heat medium in the heat release mode.

6. The heat storage system according to claim 3, wherein the heat transfer target is a heating target other than the energy converter,
the vehicle has a second heat medium passage in which a second heat medium for receiving or supplying heat between the heat storage body may flow, and
the heat storage body is operable to release heat stored in the heat storage body to the heating target through the second heat medium in the heat release mode.

7. The heat storage system according to claim 4, wherein the heat transfer target is a heating target other than the energy converter, and
the heat storage body is operable to release heat stored in the heat storage body to the heating target through the first heat medium in the heat release mode.

8. The heat storage system according to claim 4, wherein the heat transfer target is the energy converter,
the vehicle has a second heat medium passage in which a second heat medium for receiving or supplying heat between each of the heat storage body and the energy converter may flow,
the second heat medium passage is provided separately from a first heat medium passage in which the first heat medium may flow,
the heat storage body is operable to store heat of the first heat medium in the heat storage mode, and
the heat storage body is operable to release the heat stored in the heat storage body to the energy converter through the second heat medium in the heat release mode.

9. The heat storage system according to claim 1, wherein the heat storage body has
a heat storage layer that is made of a strongly correlated electron system compound and
a high heat conductivity layer that is made of a material having a greater heat conductivity relative to the heat storage layer.

10. The heat storage system according to claim 1, wherein the heat storage body is configured by a compound that includes a strongly correlated electron system compound and an inorganic compound.

11. The heat storage system according to claim 1, wherein the heat storage body has
a heat storage layer that is made of a strongly correlated electron system compound and
a heat transfer part that is operable to increase a heat transfer area transferring heat between the heat storage layer.

12. The heat storage system according to claim 1, wherein the heat storage body includes a heat storage material that is operable to store the heat released from the heat source via the first heat medium,
the heat storage material of the heat storage body is operable to change to the first phase in a solid state when a temperature of the heat storage material is lower than or equal to the phase transition temperature, and change to the second phase in a solid state when a temperature of the heat storage material exceeds the phase transition temperature,
the heat storage body includes a body portion made of the heat storage material,
the body portion has a rectangular cuboid shape, and
the body portion includes multiple holes through which the first heat medium may pass.

* * * * *